(12) United States Patent
Hashimoto et al.

(10) Patent No.: US 9,430,173 B2
(45) Date of Patent: Aug. 30, 2016

(54) INFORMATION PROCESSING DEVICE, SETTING METHOD, AND COMPUTER PROGRAM PRODUCT

(71) Applicants: Miki Hashimoto, Kanagawa (JP); Naoyuki Urata, Kanagawa (JP); Kanna Iinuma, Kanagawa (JP); Teruyoshi Yamamoto, Tokyo (JP); Ken Mitsui, Kanagawa (JP)

(72) Inventors: Miki Hashimoto, Kanagawa (JP); Naoyuki Urata, Kanagawa (JP); Kanna Iinuma, Kanagawa (JP); Teruyoshi Yamamoto, Tokyo (JP); Ken Mitsui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/562,525

(22) Filed: Dec. 5, 2014

(65) Prior Publication Data

US 2015/0160901 A1    Jun. 11, 2015

(30) Foreign Application Priority Data

Dec. 9, 2013 (JP) ................................. 2013-254520

(51) Int. Cl.
*G06F 3/12* (2006.01)

(52) U.S. Cl.
CPC ........... *G06F 3/1241* (2013.01); *G06F 3/1204* (2013.01); *G06F 3/1256* (2013.01); *G06F 3/1285* (2013.01)

(58) Field of Classification Search
USPC ....................................................... 358/1.15
See application file for complete search history.

(56) References Cited

U.S. PATENT DOCUMENTS

| | | | |
|---|---|---|---|
| 6,204,933 B1 | 3/2001 | Yoshino et al. | |
| 7,301,669 B1 | 11/2007 | Yamada et al. | |
| 7,679,781 B2 | 3/2010 | Shibuya et al. | |
| 7,948,659 B2 | 5/2011 | Shibuya et al. | |
| 2002/0030832 A1 | 3/2002 | Shibuya et al. | |
| 2004/0139389 A1* | 7/2004 | Sato ........................ | G06F 17/24 715/255 |
| 2005/0094208 A1* | 5/2005 | Mori ....................... | G06F 17/24 358/1.18 |
| 2006/0215200 A1 | 9/2006 | Mutsuro et al. | |
| 2006/0238810 A1* | 10/2006 | Fukudome .......... | G06F 17/2745 358/1.16 |
| 2007/0031047 A1 | 2/2007 | Sato et al. | |
| 2007/0296995 A1 | 12/2007 | Sakura | |
| 2008/0291478 A1 | 11/2008 | Shibuya et al. | |
| 2012/0224204 A1 | 9/2012 | Yamagishi | |
| 2012/0237243 A1 | 9/2012 | Yamamoto et al. | |
| 2012/0237245 A1 | 9/2012 | Mitsui et al. | |
| 2013/0003098 A1 | 1/2013 | Hayakawa et al. | |
| 2014/0270879 A1 | 9/2014 | Yamamoto et al. | |

* cited by examiner

*Primary Examiner* — Ngon Nguyen
(74) *Attorney, Agent, or Firm* — Duft Bornsen & Fettig LLP

(57) ABSTRACT

An information processing device includes: an acquisition unit that acquires set values of chapters representing units into which an entire job is arbitrarily divided; an image generation unit that generates a setting image including the acquired set values of the chapters as one of options of a print setting; a display control unit that performs control to display the generated setting image on a display unit; and a ticket generation unit that generates a job ticket including a designated print setting based on the setting image displayed on the display unit.

12 Claims, 13 Drawing Sheets

| Insert Position | Page Numbers | Before/After | INSERTION POSITION (RESULT) EACH HYPHEN INDICATES BEFORE OR AFTER PAGE _PAGE, PAGE_ |
|---|---|---|---|
| Input Page Number | 1 | After | 1_ |
| Input Page Number | 1, 7, 13 | Before | _1 , _7, _13 INSERTED BEFORE EACH OF INPUT PAGES SEPARATED WITH COMMAS |
| Input Page Number | 1-10 | Before | _1 , _2 , _3 , _4 , _5 , _6 , _7, _8 , _9 , _10 |
| 1-5 | (Disable) | After | 5_ |
| 1-5 | (Disable) | Before | _1 |
| All Chapters | (Disable) | Before | WHEN START PAGES OF CHAPTERS ARE DEFINED AS 1, 6, 10, SETTING IS 1-5, 6-9, 10-(LAST PAGE), SO THAT _1, _6, _10 |
| All Chapters | (Disable) | After | WHEN START PAGES OF CHAPTERS ARE DEFINED AS 1, 6, 10, SETTING IS 1-5, 6-9, 10-(LAST PAGE), SO THAT 5_, 9_, (LAST PAGE)_ |

FIG.8

| Insert Position | Page Numbers | Before/After | INSERTION POSITION (RESULT) EACH HYPHEN INDICATES BEFORE OR AFTER PAGE _PAGE, PAGE_ |
|---|---|---|---|
| Input Page Number | 1 | After | 1_ |
| Input Page Number | 1, 7, 13 | Before | _1 , _7, _13<br>INSERTED BEFORE EACH OF INPUT PAGES SEPARATED WITH COMMAS |
| Input Page Number | 1-10 | Before | _1 , _2 , _3 , _4 , _5 , _6 , _7, _8 , _9 , _10 |
| 1-5 | (Disable) | After | 5_ |
| 1-5 | (Disable) | Before | _1 |
| All Chapters | (Disable) | Before | WHEN START PAGES OF CHAPTERS ARE DEFINED AS 1, 6, 10, SETTING IS 1-5, 6-9, 10-(LAST PAGE), SO THAT _1, _6, _10 |
| All Chapters | (Disable) | After | WHEN START PAGES OF CHAPTERS ARE DEFINED AS 1, 6, 10, SETTING IS 1-5, 6-9, 10-(LAST PAGE), SO THAT 5_, 9_, (LAST PAGE)_ |

FIG.10

| Page Range | Page Numbers | PAGE RANGE (RESULT) |
|---|---|---|
| Input Page Number | 1 | SETTING OF EXCEPTION PAGE IS APPLIED TO PAGE 1 |
| Input Page Number | 1, 7, 13 | SETTING OF EXCEPTION PAGE IS APPLIED TO EACH OF PAGES 1, 7, AND 13 |
| Input Page Number | 1-10 | SETTING OF EXCEPTION PAGE IS APPLIED TO PAGES 1 TO 10 |
| 1-5 | (Disable) | SETTING OF EXCEPTION PAGE IS APPLIED TO PAGES 1 TO 5 (= FIRST CHAPTER) |
| All Chapters | (Disable) | WHEN CHAPTERS ARE DEFINED AS 1, 6, 10, SETTING IS 1-5, 6-9, 10-(LAST PAGE), SO THAT SETTING OF EXCEPTION PAGE IS APPLIED TO 1-5, 6-9, 10-(LAST PAGE) (= FIRST CHAPTER, SECOND CHAPTER, AND THIRD CHAPTER) |

FIG.11

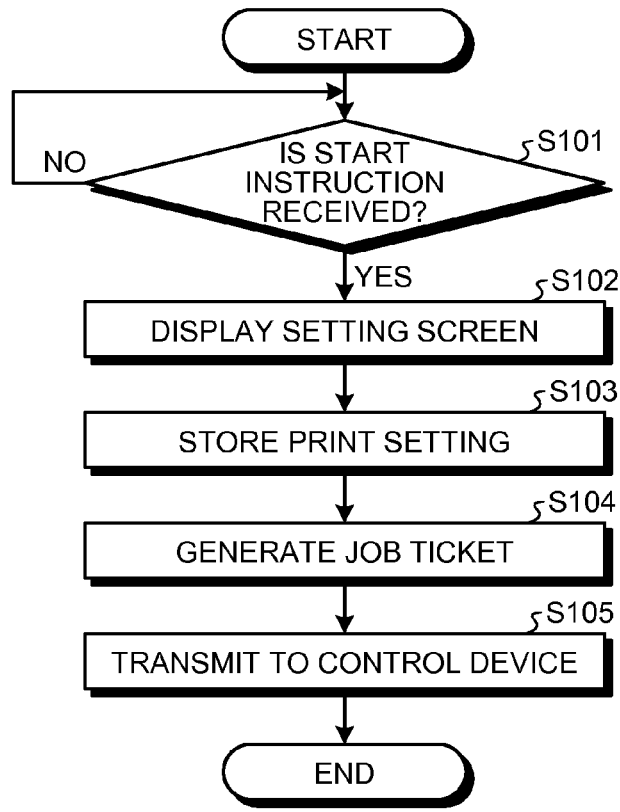

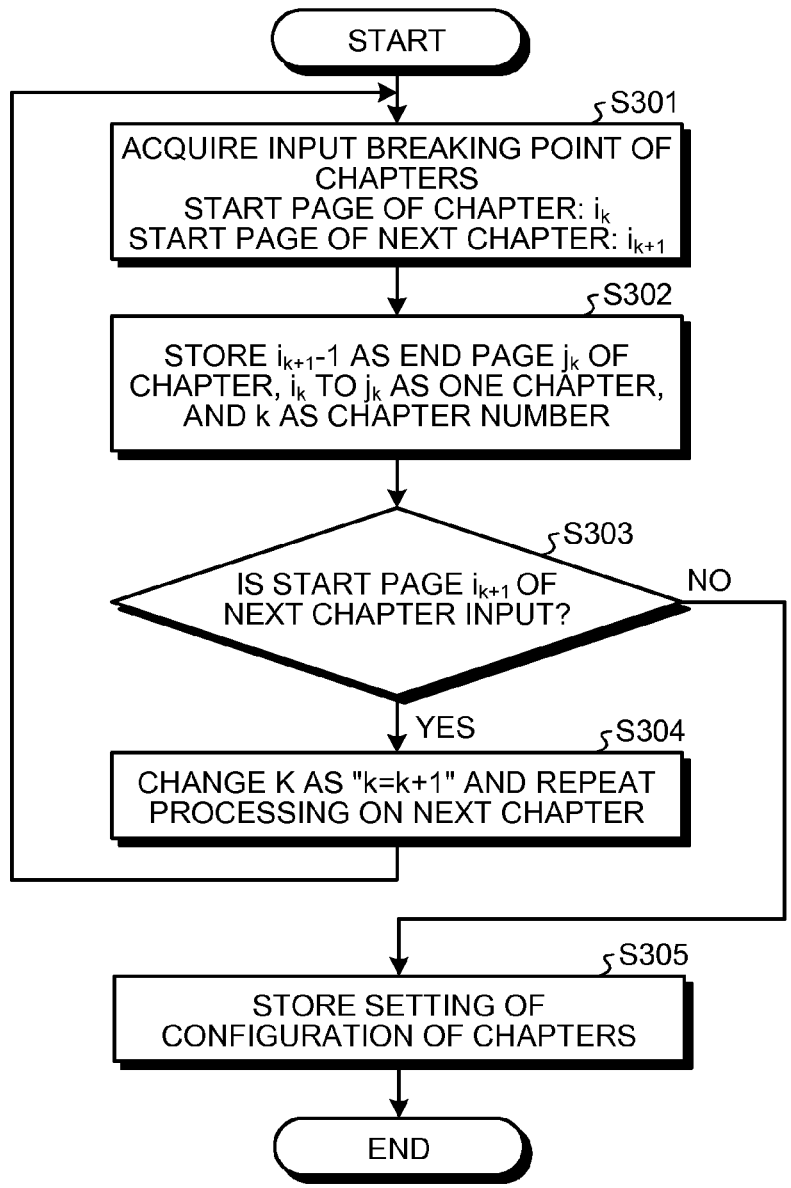

INFORMATION PROCESSING DEVICE, SETTING METHOD, AND COMPUTER PROGRAM PRODUCT

CROSS-REFERENCE TO RELATED APPLICATIONS

The present application claims priority to and incorporates by reference the entire contents of Japanese Patent Application No. 2013-254520 filed in Japan on Dec. 9, 2013.

BACKGROUND OF THE INVENTION

1. Field of the Invention

The present invention relates to an information processing device, a setting method, and a computer program product.

2. Description of the Related Art

In production printing industry, a printing output itself may be a product in many cases. Accordingly, printers for production are desired to output high-value-added printed matter in which a printing media type or a print setting is different for each page, instead of simple printed matter such as conventional office printing. Examples of a technique for implementing the print setting different for each page include a function called a specialized page.

For example, types of the function of the specialized page include an insertion page and an exception page. Among these, the insertion page is a function for newly inserting a page different from a job into a designated position. The exception page is a function for applying a print setting different from the job to a designated page range. That is, with the exception page, a set value different from the job can be applied to a sheet setting, a postprocessing setting, a color/monochrome setting, and/or the like.

As the technique for setting the specialized page as described above, there is a technique for applying a setting of exception page without opening a setting screen for the exception page by performing a predetermined operation in a setting screen for the entire document.

Conventional techniques are described in Japanese Patent No. 4817986 and Japanese Patent Application Laid-open No. 2013-012033 for example.

However, in the related art described above, a burden on a user increases in print setting. In the print setting, there is a concept of "chapters" representing units into which the entire job is arbitrarily divided. The chapters are a function for designating pages to be breaking points. In the related art described above, to define a configuration of chapters and further set the exception page and the insertion page in association with the chapters, the user should memorize ranges of the chapters. As a result, in the related art, the burden on the user increases in print setting.

In view of the above, there is a need to provide an information processing device, a setting method, and a computer program product that can reduce the burden on the user in print setting.

SUMMARY OF THE INVENTION

It is an object of the present invention to at least partially solve the problems in the conventional technology.

An information processing device includes: an acquisition unit that acquires set values of chapters representing units into which an entire job is arbitrarily divided; an image generation unit that generates a setting image including the acquired set values of the chapters as one of options of a print setting; a display control unit that performs control to display the generated setting image on a display unit; and a ticket generation unit that generates a job ticket including a designated print setting based on the setting image displayed on the display unit.

A setting method includes: acquiring set values of chapters representing units into which an entire job is arbitrarily divided; generating a setting image including the acquired set values of the chapters as one of options of a print setting; performing control to display the generated setting image on a display unit; and generating a job ticket including a designated print setting based on the setting image displayed on the display unit.

A computer program product includes a non-transitory computer-readable medium containing an information processing program. The program causes a computer to perform: acquiring set values of chapters representing units into which an entire job is arbitrarily divided; generating a setting image including the acquired set values of the chapters as one of options of a print setting; performing control to display the generated setting image on a display unit; and generating a job ticket including a designated print setting based on the setting image displayed on the display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram for explaining an example of an insertion position corresponding to a set value set in the setting image for setting the insertion page;

FIG. 10 is a diagram for explaining an example of a page range corresponding to the set value set in the setting image for setting the exception page;

FIG. 11 is a flowchart illustrating an example of a procedure of print instruction transmission processing according to the first embodiment;

FIG. 13 is a flowchart illustrating an example of a detailed procedure of the definition processing on the configuration of the chapters according to the first embodiment;

FIG. 14 is a diagram illustrating a data configuration example of the chapters;

DETAILED DESCRIPTION OF THE PREFERRED EMBODIMENTS

The following describes embodiments of an information processing device, a setting method, and a computer program product according to the present invention with reference to the attached drawings. However, the present invention is not limited to the embodiments described below.

First Embodiment

System Configuration

Figure 1:
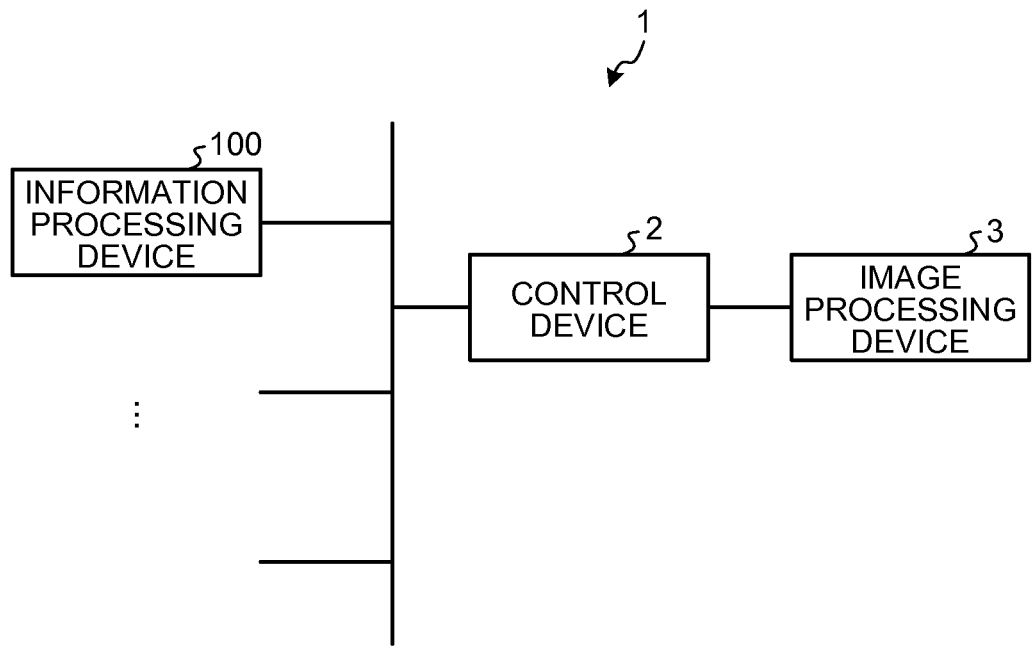
FIG. 1 is a diagram illustrating a system configuration example of a printing system according to a first embodiment of the present invention.

The following describes a system configuration of a printing system according to a first embodiment with reference to FIG. 1. FIG. 1 is a diagram illustrating a system configuration example of the printing system according to the first embodiment.

As illustrated in FIG. 1, a printing system 1 includes an information processing device 100, a control device 2, and an image processing device 3. The information processing device 100, the control device 2, and the image processing device 3 are connected to a network such as a local area network (LAN) and the Internet. A plurality of information processing devices 100, control devices 2, and image processing devices 3 may be connected to the network.

A user performs print setting using the information processing device 100. Accordingly, the information processing device 100 generates a job ticket including the print setting, and transmits the generated job ticket to the control device 2 via the network. The control device 2 receives the job ticket transmitted by the information processing device 100, and interprets the received job ticket to output a printing command to the image processing device 3. The image processing device 3 then performs printing processing according to the printing command output from the control device 2. The image processing device 3 may be a multi-function peripheral having at least two functions including a printing function among the printing function, a copying function, a scanner function, and a facsimile function.

Hardware Configuration

Figure 2:
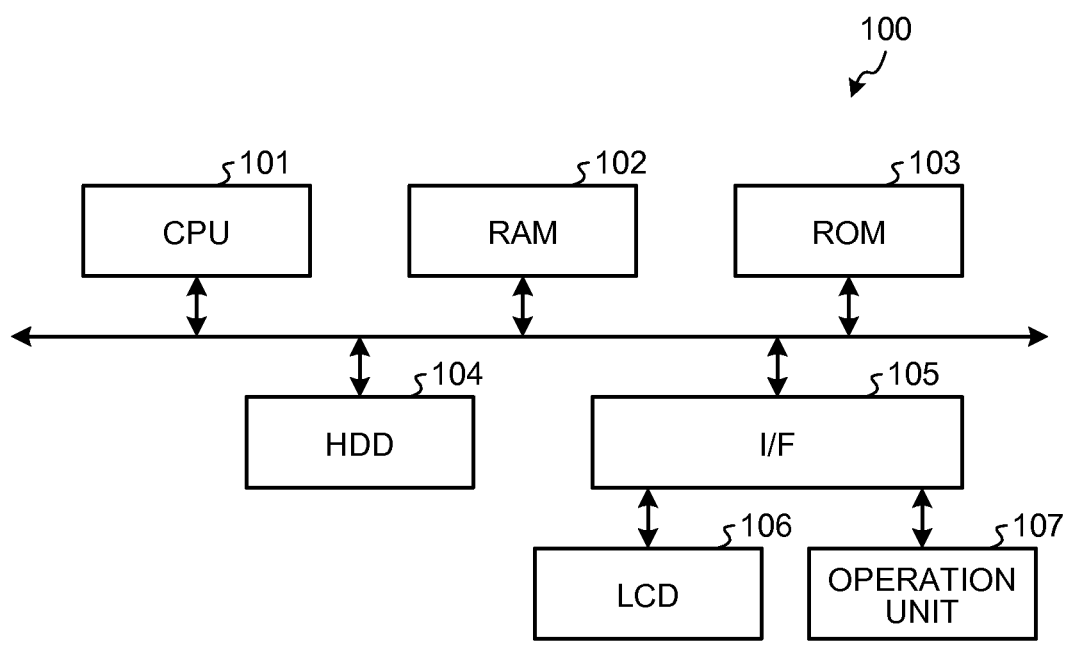
FIG. 2 is a block diagram illustrating a hardware configuration example of an information processing device according to the first embodiment.
Figure 3:
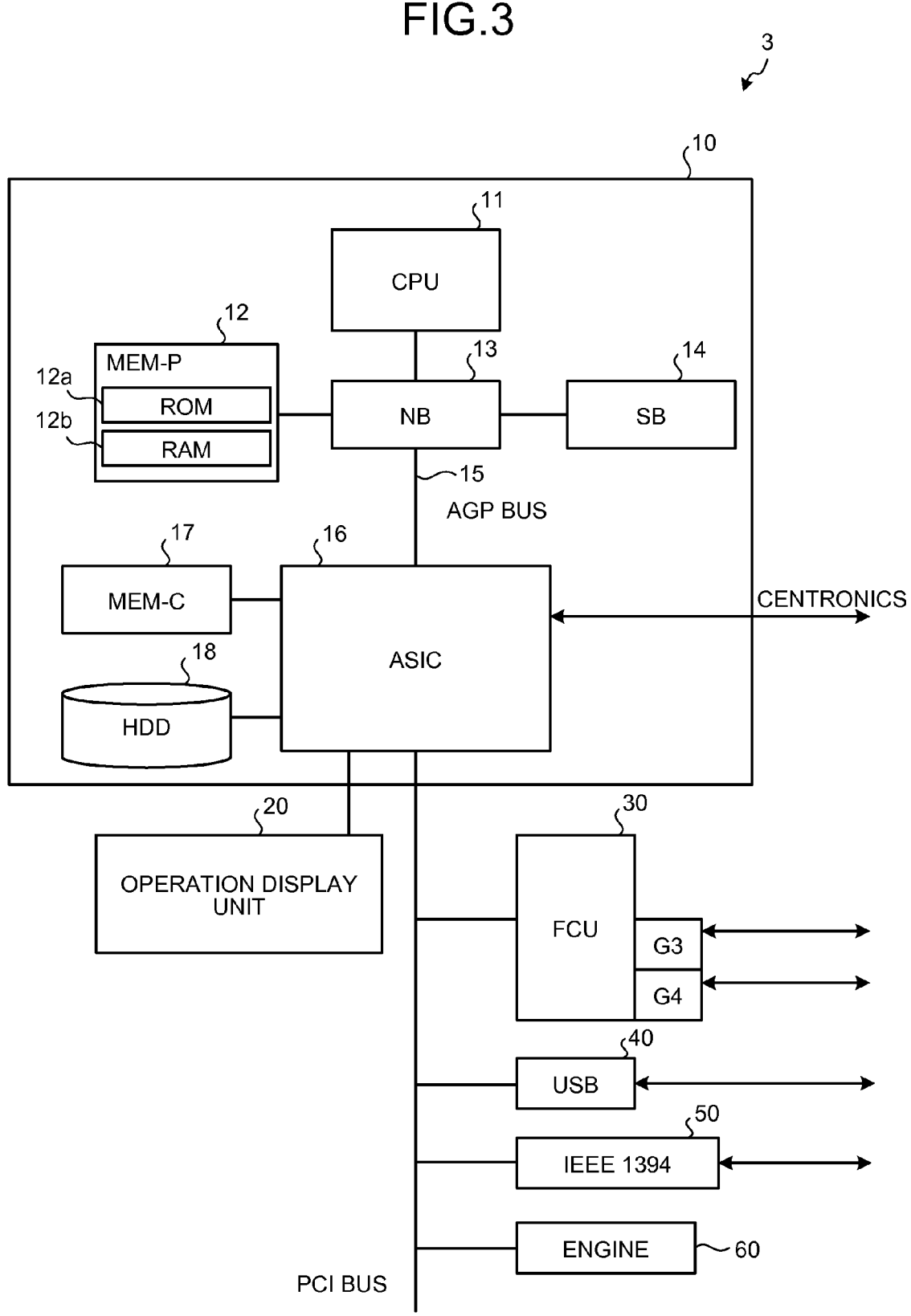
FIG. 3 is a block diagram illustrating a hardware configuration example of an image processing device according to the first embodiment.

Next, the following describes hardware configurations of the information processing device 100, the control device 2, and the image processing device 3 according to the first embodiment with reference to FIG. 2 and FIG. 3. The hardware configurations of the information processing device 100 and the control device 2 are the same, so that the hardware configuration of the information processing device 100 will be described with reference to FIG. 2.

FIG. 2 is a block diagram illustrating a hardware configuration example of the information processing device 100 according to the first embodiment. As illustrated in FIG. 2, the information processing device 100 includes a central processing unit (CPU) 101, a random access memory (RAM) 102, a read only memory (ROM) 103, a hard disk drive (HDD) 104, an interface (I/F) 105, a liquid crystal display (LCD) 106, and an operation unit 107 that are connected to a bus.

The CPU 101 controls the entire operation of the information processing device 100. For example, the CPU 101 executes a computer program stored in the ROM 103, the HDD 104 or the like using the RAM 102 as a work area (working space) to control the entire operation of the information processing device 100. The RAM 102 is a volatile storage medium that can read and write information at high speed. For example, the RAM 102 is utilized as a work area (working space) when the CPU 101 performs processing. The ROM 103 is a read-only non-volatile storage medium. For example, the ROM 103 stores therein a computer program such as firmware.

The HDD 104 is a non-volatile storage medium that can read and write information. For example, the HDD 104 stores therein an operating system (OS), various control programs, an application program, and/or the like. The I/F 105 connects the bus with various pieces of hardware or networks and controls them. The LCD 106 is a visual user interface (UI) for displaying and outputting various pieces of information. The operation unit 107 is a UI such as a keyboard or a mouse for inputting various pieces of information.

FIG. 3 is a block diagram illustrating a hardware configuration example of the image processing device 3 according to the first embodiment. As illustrated in FIG. 3, the image processing device 3 has a configuration in which a controller 10 and an engine unit (Engine) 60 are connected with each other using a peripheral component interface (PCI) bus. The controller 10 is a controller that controls the entire image processing device 3, drawing, communication, and an input from an operation unit (not illustrated). The engine unit 60 is a printer engine or the like that can be connected to the PCI bus, such as a black-and-white plotter, a one-drum color plotter, a four-drum color plotter, a scanner, or a fax unit. The engine unit 60 includes an image processing part for error expansion, gamma conversion, and/or the like in addition to what is called an engine part such as a plotter.

The controller 10 includes a CPU 11, a Northbridge (NB) 13, a system memory (MEM-P) 12, a Southbridge (SB) 14, a local memory (MEM-C) 17, an application specific integrated circuit (ASIC) 16, and a hard disk drive (HDD) 18. The Northbridge 13 and the ASIC 16 are connected with each other via an accelerated graphics port (AGP) bus 15. The MEM-P 12 includes a read only memory (ROM) 12a and a random access memory (RAM) 12b.

The CPU 11 controls the entire image processing device 3, and includes a chipset including the Northbridge 13, the MEM-P 12, and the Southbridge 14 to be connected to another device via the chipset.

The Northbridge 13 is a bridge for connecting the CPU 11 with the MEM-P 12, the Southbridge 14, and the AGP bus 15, and includes a memory controller that controls reading/writing with respect to the MEM-P 12, a PCI master, and an AGP target.

The MEM-P 12 is a system memory used as a memory for storing a computer program or data, a memory for expanding a computer program or data, a memory for drawing of a printer, and/or the like, and includes the ROM 12a and the RAM 12b. The ROM 12a is a read-only memory used as the memory for storing a computer program or data, and the RAM 12b is a writable and readable memory used as the memory for expanding a computer program or data, the memory for drawing of a printer, and/or the like.

The Southbridge 14 is a bridge for connecting the Northbridge 13 with a PCI device and a peripheral device. The Southbridge 14 is connected with the Northbridge 13 via the PCI bus. A network interface (I/F) unit and the like are also connected to the PCI bus.

The ASIC 16 is an integrated circuit (IC) for image processing use including a hardware element for image processing, and functions as a bridge for connecting the AGP bus 15, the PCI bus, the HDD 18, and the MEM-C 17. The ASIC 16 includes a PCI target, an AGP master, an arbiter (ARB) being the core of the ASIC 16, a memory controller that controls the MEM-C 17, a plurality of direct memory access controllers (DMACs) that rotates image data using hardware logic or the like, and is connected with the engine unit 60, a facsimile control unit (FCU) 30, a universal serial bus (USB) 40, and the Institute of Electrical and Electronics Engineers 1394 (IEEE1394) interface 50 via the PCI bus. An operation display unit 20 is directly connected to the ASIC 16.

The MEM-C 17 is a local memory used as an image buffer for copying and a code buffer. The hard disk drive (HDD) 18 is a storage for accumulating image data, a computer program, font data, and a form.

The AGP bus 15 is a bus interface for a graphics accelerator card that is proposed for accelerating graphic processing. The AGP bus 15 accelerates the graphics accelerator card by directly accessing the MEM-P 12 with high throughput.

Functional Configuration

Figure 4:
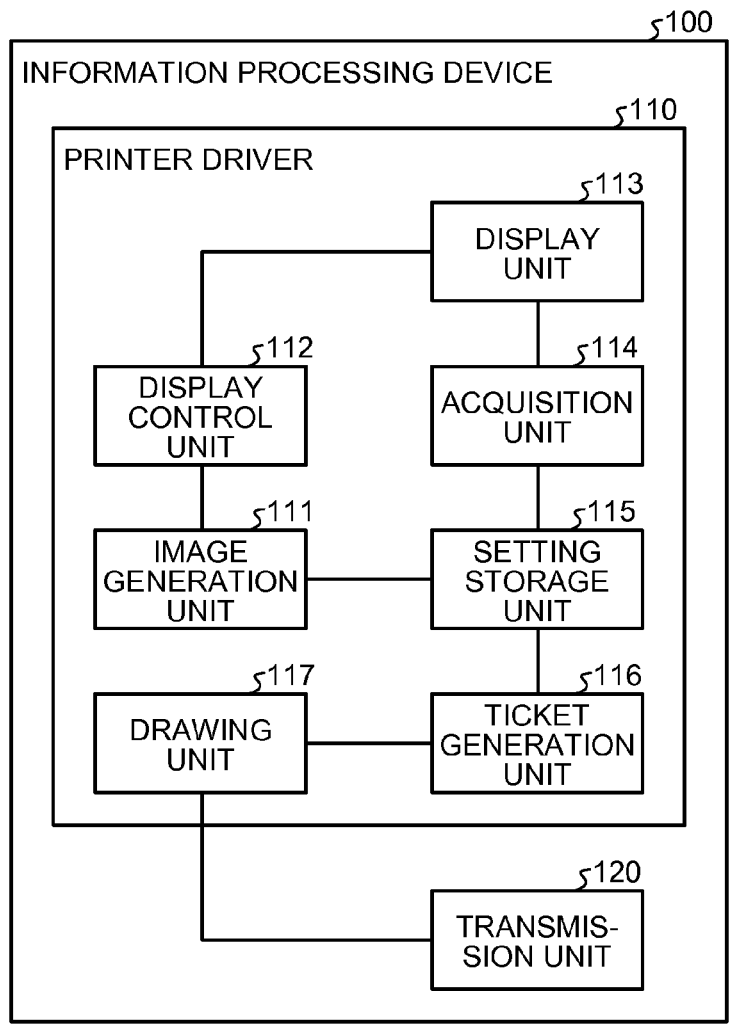
FIG. 4 is a block diagram illustrating a functional configuration example of the information processing device according to the first embodiment.
Figure 5:
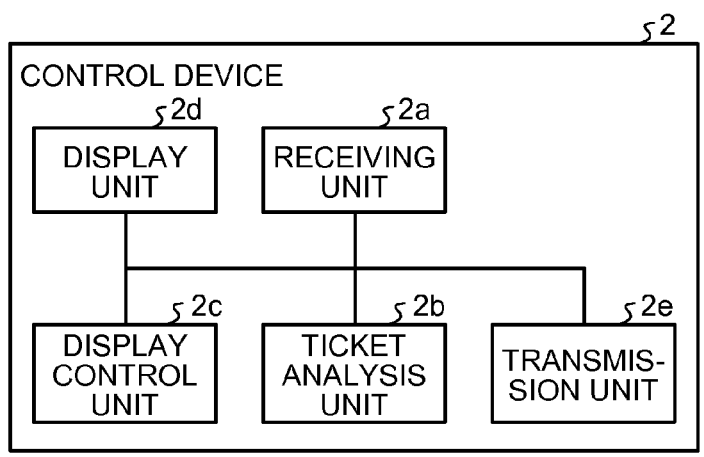
FIG. 5 is a block diagram illustrating a functional configuration example of a control device according to the first embodiment.

Next, the following describes a functional configuration of the device according to the first embodiment with reference to FIG. 4 and FIG. 5. FIG. 4 is a block diagram illustrating a functional configuration example of the information processing device 100 according to the first embodiment.

As illustrated in FIG. 4, the information processing device 100 includes a printer driver 110 and a transmission unit 120. Among these, the printer driver 110 includes an image generation unit 111, a display control unit 112, a display unit 113, an acquisition unit 114, a setting storage unit 115, a ticket generation unit 116, and a drawing unit 117. Part or all of the components described above may be made with software (computer program) or a hardware circuit.

The image generation unit 111 generates various images to be displayed on the display unit 113. More specifically, the image generation unit 111 generates a setting image when the user performs an operation for performing print setting in executing an application such as document preparation. For example, the setting image includes an image for performing typical print setting, an image for performing print setting for a specialized page such as an insertion page, an exception page, and a tab for utilizing a sheet different from the entire page as a partition, an image for setting chapters, and the like. The chapters represent units into which the entire job is arbitrarily divided. When set values of the chapters are stored in the setting storage unit 115 described later, the image generation unit 111 generates a setting image including the set values as one of options of the print setting. The image generation unit 111 then outputs the generated setting image to the display control unit 112.

The display control unit 112 performs control to display an image on the display unit 113. More specifically, the display control unit 112 performs control to display the setting image output from the image generation unit 111 on the display unit 113. The display unit 113 is a display for displaying various images. For example, the display unit 113 displays the setting image for performing print setting due to the control by the display control unit 112.

Figure 6:
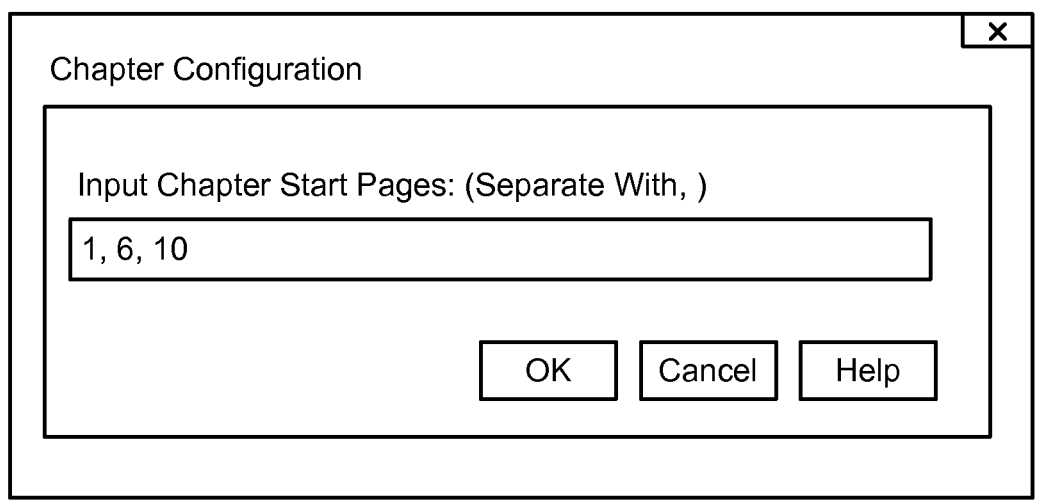
FIG. 6 is a diagram illustrating an example of a setting image for defining a configuration of chapters.

FIG. 6 is a diagram illustrating an example of the setting image for defining the configuration of the chapters. As illustrated in FIG. 6, in the setting image for defining the configuration of the chapters, the configuration of the chapters can be defined by inputting start pages of the chapters separated with a comma or the like. For example, when "1, 6, 10" are input, three chapters are defined including a chapter of pages 1 to 5, a chapter of pages 6 to 9, and a chapter of pages 10 to the last. As described above, when the configuration of the chapters is defined, ranges of the chapters are displayed as options of page ranges in the setting image of the specialized page. The user can select the range of the chapter from options and easily perform setting on the range of the chapter.

Figure 7:
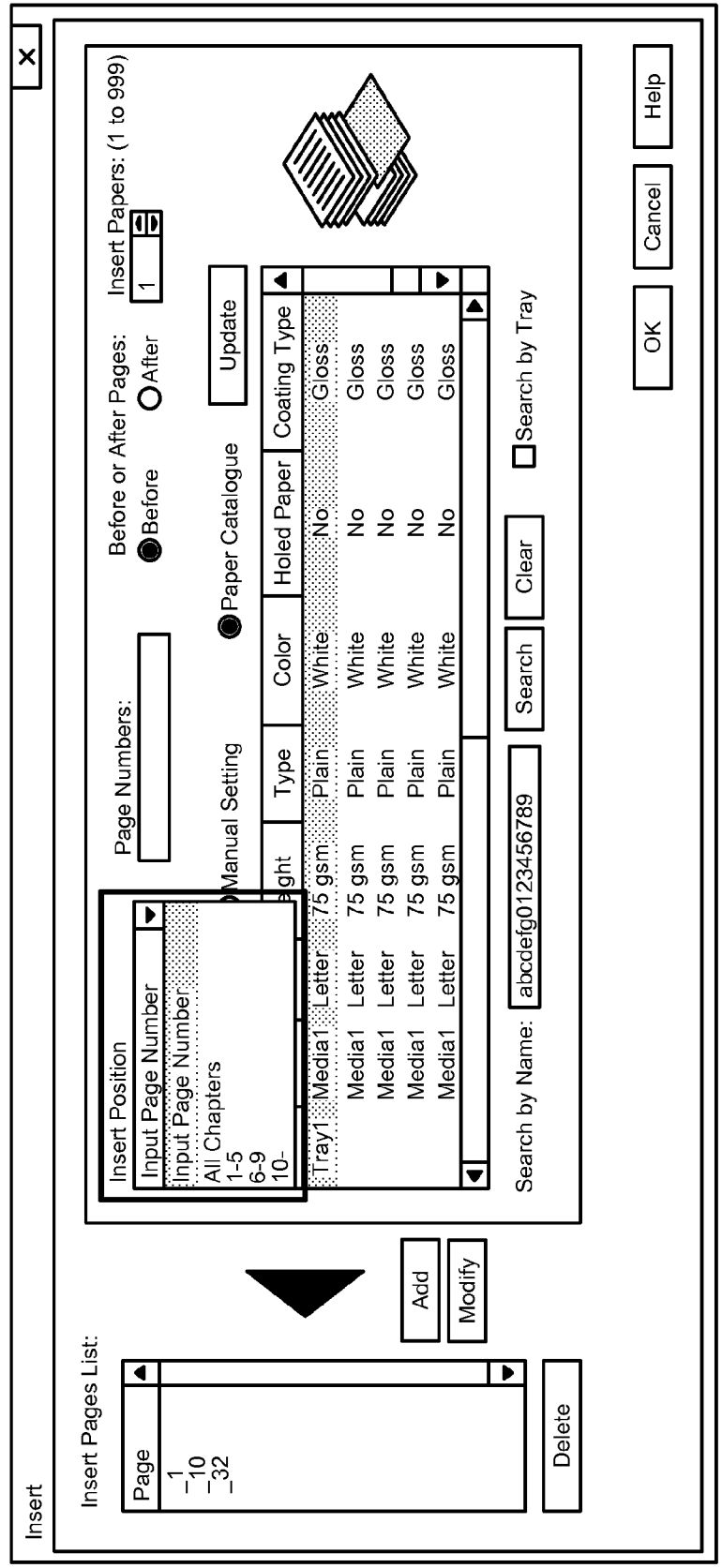
FIG. 7 is a diagram illustrating an example of a setting image for setting an insertion page.

FIG. 7 is a diagram illustrating an example of the setting image for setting the insertion page. As illustrated in FIG. 7, in the setting image for setting the insertion page, an insertion position can be determined based on "Insert Position", "Page Numbers", and "Before or After Pages". "Insert Position" includes options corresponding to the configuration of the chapters defined in advance in the setting image illustrated in FIG. 6 or the like. In the example illustrated in FIG. 7, "1-5", "6-9", and "10-" correspond to the options corresponding to the configuration of the chapters. When "Input Page Number" is selected from the options of "Insert Position", "Page Numbers" can be designated. When "All Chapters" is selected from the options of "Insert Position", the insertion position can be set to all the chapters defined in advance. At "Before or After Pages", the insertion position can be set before or after the designated page by selecting "Before" or "After".

FIG. 8 is a diagram for explaining an example of the insertion position corresponding to the set value set in the setting image for setting the insertion page. FIG. 8 exemplifies a case in which "1, 6, 10" are input in defining the configuration of the chapters as illustrated in FIG. 6. For example, as illustrated in FIG. 8, when "Input Page Number" is selected from the options of "Insert Position", "1" is input to "Page Numbers", and "After" is selected in "Before or After Pages (Before/After)", the insertion position is after page 1 (1_). When "1-5" corresponding to the configuration of the chapters is selected from the options of "Insert Position" and "After" is selected in "Before or After Pages (Before/After)", the insertion position is after page 5 (5_). When "All Chapters" is selected from the options of "Insert Position" and "Before" is selected in "Before or After Pages (Before/After)", the insertion positions are before page 1 (_1), before page 6 (_6), and before page 10 (_10).

Figure 9:
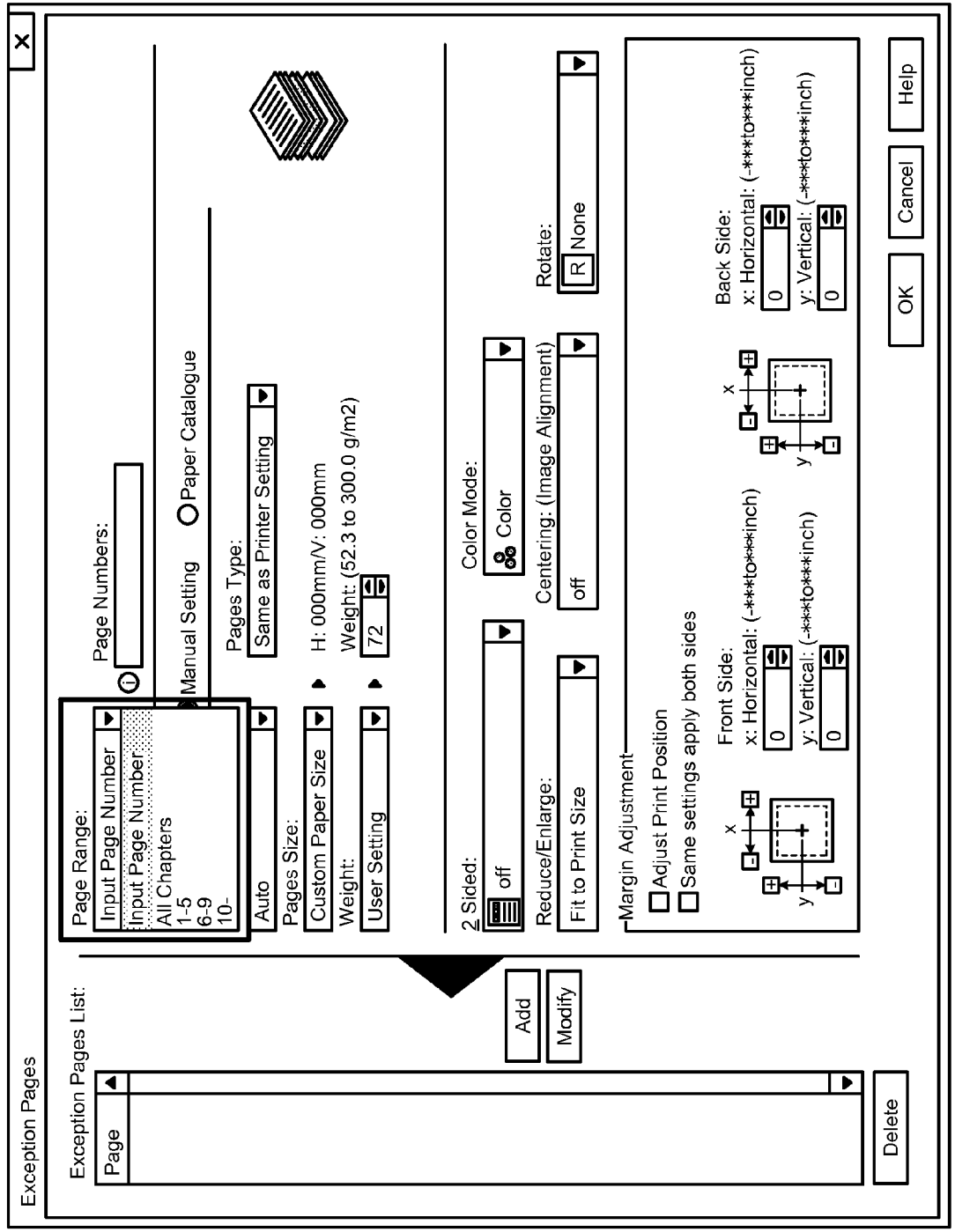
FIG. 9 is a diagram illustrating an example of the setting image for setting an exception page.

FIG. 9 is a diagram illustrating an example of the setting image for setting the exception page. As illustrated in FIG. 9, in the setting image for setting the exception page, the page range can be determined based on "Page Range" and "Page Numbers". "Page Range" includes the options corresponding to the configuration of the chapters defined in advance in the setting image illustrated in FIG. 6 or the like. In the example illustrated in FIG. 9, "1-5", "6-9", and "10-" correspond to the options corresponding to the configuration of the chapters. When "Input Page Number" is selected from the options of "Page Range", "Page Numbers" can be designated. When "All Chapters" is selected from the options of "Page Range", the exception page can be set to all the chapters defined in advance.

FIG. 10 is a diagram for explaining an example of the page range corresponding to the set value set in the setting image for setting the exception page. FIG. 10 exemplifies a case in which "1, 6, 10" are input in defining the configuration of the chapters as illustrated in FIG. 6. For example, as illustrated in FIG. 10, when "Input Page Number" is selected from the options of "Page Range" and "1" is input to "Page Numbers", the setting of exception page is applied to page 1. When "1-5" corresponding to the configuration of the chapters is selected from the options of "Page Range", the setting of exception page is applied to pages 1 to 5 being the first chapter. When "All Chapters" is selected from the options of "Page Range", the setting of exception page is applied to pages 1 to 5 being the first chapter, pages 6 to 9 being the second chapter, and pages 10 to the last being the third chapter.

Returning back to FIG. 4, the acquisition unit 114 acquires the set value related to the print setting. More specifically, the acquisition unit 114 acquires the set value designated by the user operation based on the setting image of the print setting displayed on the display unit 113. For example, the set values acquired by the acquisition unit 114 include set values related to the configuration of the chapters. The acquisition unit 114 then stores the acquired set value in the setting storage unit 115. The setting storage unit 115 stores the set value related to the print setting. For example, the setting storage unit 115 stores various print settings designated by the user including the set values related to the configuration of the chapters or the like.

The ticket generation unit 116 generates a job ticket. More specifically, the ticket generation unit 116 generates the job ticket reflecting the various print settings stored in the setting storage unit 115. The job ticket is a job ticket for causing the image processing device 3 to perform printing. The drawing unit 117 generates page description language (PDL) data that can be interpreted by the image processing device 3. More specifically, the drawing unit 117 generates the PDL data that can be interpreted by the image processing device 3, and outputs the generated PDL data to the transmission unit 120 together with the job ticket generated by the ticket generation unit 116. The transmission unit 120 communicates with an external device and transmits various pieces of information. For example, the transmission unit 120 transmits the PDL data or the job ticket output from the drawing unit 117 to the control device 2.

FIG. 5 is a block diagram illustrating a functional configuration example of the control device 2 according to the first embodiment. As illustrated in FIG. 5, the control device 2 includes a receiving unit 2a, a ticket analysis unit 2b, a display control unit 2c, a display unit 2d, and a transmission unit 2e. Part or all of the components described above may be made with software (computer program) or a hardware circuit.

The receiving unit 2a communicates with an external device and receives various pieces of information. More specifically, the receiving unit 2a receives the PDL data or the job ticket transmitted by the information processing device 100. The ticket analysis unit 2b analyzes the job ticket. More specifically, the ticket analysis unit 2b analyzes content of the job ticket received by the receiving unit 2a and reads the print setting.

The display control unit 2c performs control to display an image on the display unit 2d. More specifically, the display control unit 2c generates an image for displaying print data as a job, an image for preview display according to the PDL data and the print setting read by the ticket analysis unit 2b, and/or the like, and performs control to display the generated images on the display unit 2d. The display unit 2d is a display for displaying various images. For example, the display unit 2d displays the print data as a job or performs preview display for printing under the control of the display control unit 2c. The transmission unit 2e communicates with an external device and transmits various pieces of information. For example, the transmission unit 2e transmits the print data to the image processing device 3.

Procedure of Print Instruction Transmission Processing

Next, the following describes a procedure of print instruction transmission processing according to the first embodiment with reference to FIG. 11. FIG. 11 is a flowchart illustrating an example of the procedure of print instruction transmission processing according to the first embodiment. The print instruction transmission processing mainly indicates processing by the information processing device 100 (printer driver 110).

As illustrated in FIG. 11, when the printer driver 110 receives a start instruction for a screen for performing print setting (Yes at Step S101), the display unit 113 displays the setting image generated by the image generation unit 111 according to the control by the display control unit 112 (Step S102). On the other hand, when the start instruction for performing print setting is not received (No at Step S101), the printer driver 110 is in a state of waiting for the start instruction.

The acquisition unit 114 acquires the set value designated by the user operation based on the setting image displayed on the display unit 113, and stores the set value of the print setting in the setting storage unit 115 (Step S103). The ticket generation unit 116 generates the job ticket reflecting the set values of various print settings stored in the setting storage unit 115 (Step S104). The drawing unit 117 generates the PDL data that can be interpreted by the image processing device 3, and transmits the PDL data or the job ticket to the control device 2 via the transmission unit 120 (Step S105).

Processing Procedure According to Configuration of Chapters and Print Setting

Figure 12:
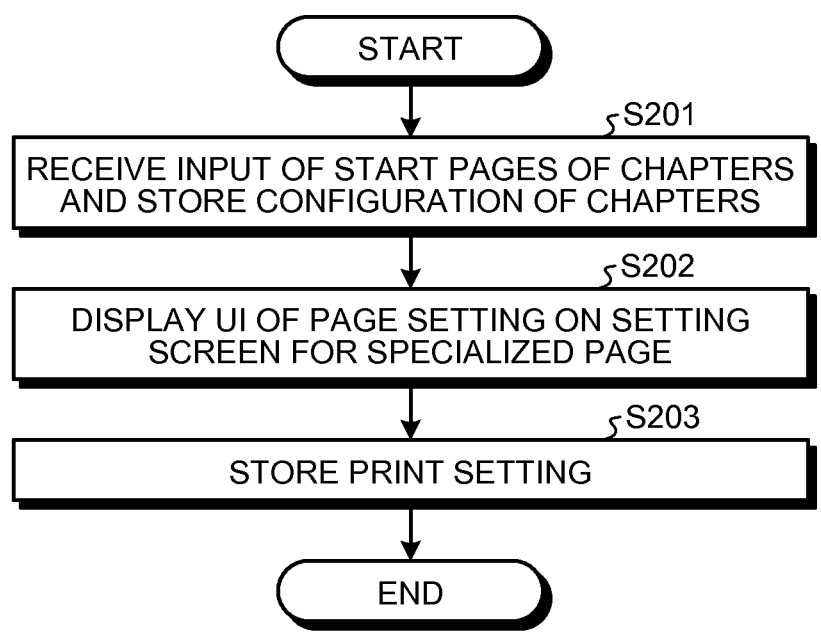
FIG. 12 is a flowchart illustrating an example of a procedure of definition processing on the configuration of the chapters and print setting processing on a specialized page according to the first embodiment.

Next, the following describes a procedure of definition processing on the configuration of the chapters and print setting processing on the specialized page according to the first embodiment with reference to FIG. 12. FIG. 12 is a flowchart illustrating an example of the procedure of the definition processing on the configuration of the chapters and the print setting processing on the specialized page according to the first embodiment. The flowchart illustrated in FIG. 12 represents details about the processing at Step S102 and Step S103 illustrated in FIG. 11.

As illustrated in FIG. 12, the acquisition unit 114 receives an input of the start pages of the chapters designated by the user operation based on the setting image for defining the configuration of the chapters displayed on the display unit 113, and stores the input in the setting storage unit 115 (Step S201). For example, in the user operation, the user performs an operation of inputting start pages of the chapters separated with a comma or the like.

The user then performs a user operation to open the setting screen for printing the specialized page. Accordingly, the image generation unit 111 generates the setting image for performing print setting for the specialized page. The setting image includes the options related to the configuration of the chapters stored in the setting storage unit 115. Subsequently, the display unit 113 displays the setting image generated by the image generation unit 111 according to the control by the display control unit 112 (Step S202).

The user performs the print setting for the specialized page based on the setting image displayed on the display unit 113. The acquisition unit 114 acquires the set value of the print setting designated by the user operation based on the setting image displayed on the display unit 113, and stores the set value in the setting storage unit 115 (Step S203). Regarding the insertion page among the specialized page, a sheet can be selected. Regarding the exception page, a sheet setting, a color/monochrome setting, rotation, print position adjustment, imposition, duplex/simplex printing, magnification/reduction, and/or the like can be set.

Detailed Procedure of Definition Processing on Configuration of Chapters

Next, the following describes a detailed procedure of definition processing on the configuration of the chapters according to the first embodiment with reference to FIG. 13. FIG. 13 is a flowchart illustrating an example of the detailed procedure of the definition processing on the configuration of the chapters according to the first embodiment. The flowchart illustrated in FIG. 13 represents details about the processing at Step S201 illustrated in FIG. 12.

As illustrated in FIG. 13, the acquisition unit 114 acquires a breaking point of the chapters (for example, comma separation) designated by the user operation based on the setting image for defining the configuration of the chapters displayed on the display unit 113 (Step S301). Herein, the start page of the chapter is assumed to be "$i_k$", and the start page of the next chapter is assumed to be "$i_{k+1}$". The acquisition unit 114 then stores "$i_{k+1}-1$" as the end page of the chapter "$j_k$", "$i_k$" to "$j_k$" as one chapter, and "k" as a chapter number thereof, in the setting storage unit 115 (Step S302).

The acquisition unit 114 then determines whether the start page "$i_{k+1}$" of the next chapter is input (Step S303). In this case, if the start page "$i_{k+1}$" of the next chapter is input (Yes at Step S303), the acquisition unit 114 changes k as "k=k+1" and repeats the above processing on the next chapter (Step S304). On the other hand, if the start page "$i_{k+1}$" of the next chapter is not input (No at Step S303), the acquisition unit 114 stores the set values of the configuration of the chapters in the setting storage unit 115 because the processing has been performed on the set values of the configuration of all the chapters (Step S305).

FIG. 14 is a diagram illustrating a data configuration example of the chapters. For example, as illustrated in FIG. 14, when "1, 6, 10" are input in defining the configuration of the chapters, the setting storage unit 115 stores "1" as the start page and "5" as the end page of the first chapter, "6" as the start page and "9" as the end page of the second chapter, "10" as the start page of the third chapter, and the final page of an original as the end page of the third chapter. As described above, "$i_k$" as the start pages and "$j_k$" as the end pages are held as page information of the chapters. The chapter number of the first chapter is held as "1", and the chapter number of the second chapter is held as "2", and so on.

Detailed Procedure of Setting Processing on Specialized Page

Figure 15:
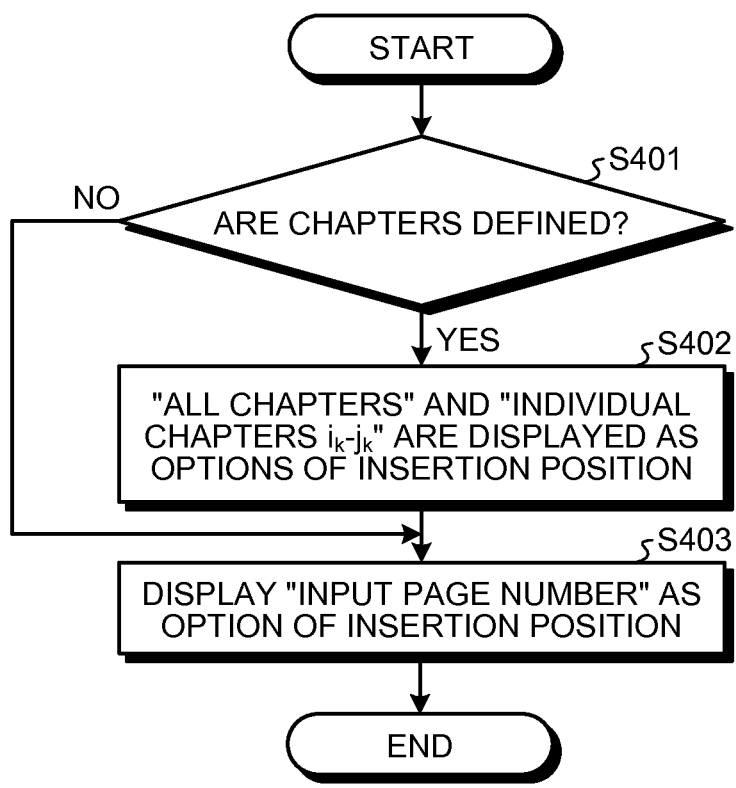
FIG. 15 is a flowchart illustrating an example of a detailed procedure of setting processing on the specialized page according to the first embodiment.

Next, the following describes a detailed procedure of setting processing on the specialized page according to the first embodiment with reference to FIG. 15. FIG. 15 is a flowchart illustrating an example of the detailed procedure of the setting processing on the specialized page according to the first embodiment. The flowchart illustrated in FIG. 15 represents details about the processing at Step S202 illustrated in FIG. 12.

As illustrated in FIG. 15, if the setting storage unit 115 stores the definition of the chapters (Yes at Step S401), the image generation unit 111 generates the setting image including "All Chapters" and individual chapters "$i_k$–$j_k$" as the options of the insertion position. The display control unit 112 then displays the setting image generated by the image generation unit 111 on the display unit 113 (Step S402). The image generation unit 111 also generates the setting image including "Input Page Number" as the option of the insertion position. The display control unit 112 displays the setting image generated by the image generation unit 111 on the display unit 113 (Step S403). That is, if there is the definition of the chapters, the options are displayed including "All Chapters", "Input Page Number", and the defined chapters.

On the other hand, if the setting storage unit 115 does not store the definition of the chapters (No at Step S401), the image generation unit 111 generates the setting image including "Input Page Number" as the option of the insertion position. The display control unit 112 then displays the setting image generated by the image generation unit 111 on the display unit 113 (Step S403). That is, if there is no definition of the chapters, the option including only "Input Page Number" is displayed.

Figure 16:
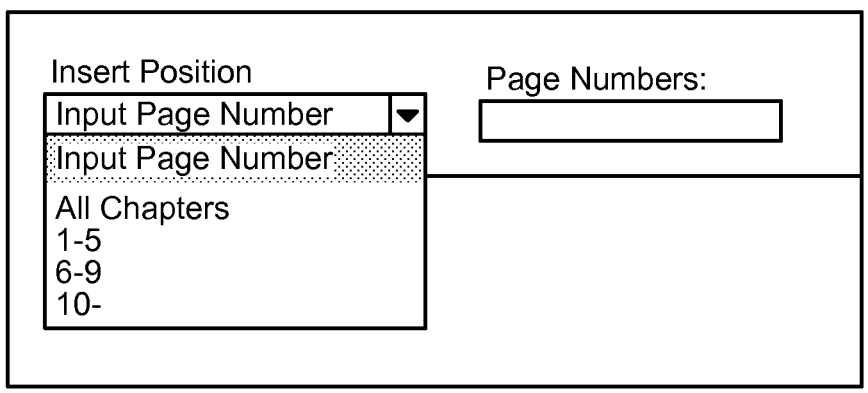
FIG. 16 is a diagram illustrating an example of a UI for designating an insertion position of the specialized page.

FIG. 16 is a diagram illustrating an example of a UI for designating the insertion position of the specialized page. As illustrated in FIG. 16, when "Input Page Number" is selected, an arbitrary page can be input in "Page Numbers". In such an input, not only a single page but a plurality of pages can be designated by separating with a comma or the like, or a page range can be designated with a hyphen or the like. As described above, when "All Chapters" or the range of the defined chapter is selected, the input to "Page Numbers" by the user is not required.

Procedure of Insertion Position Setting Processing

Figure 17:
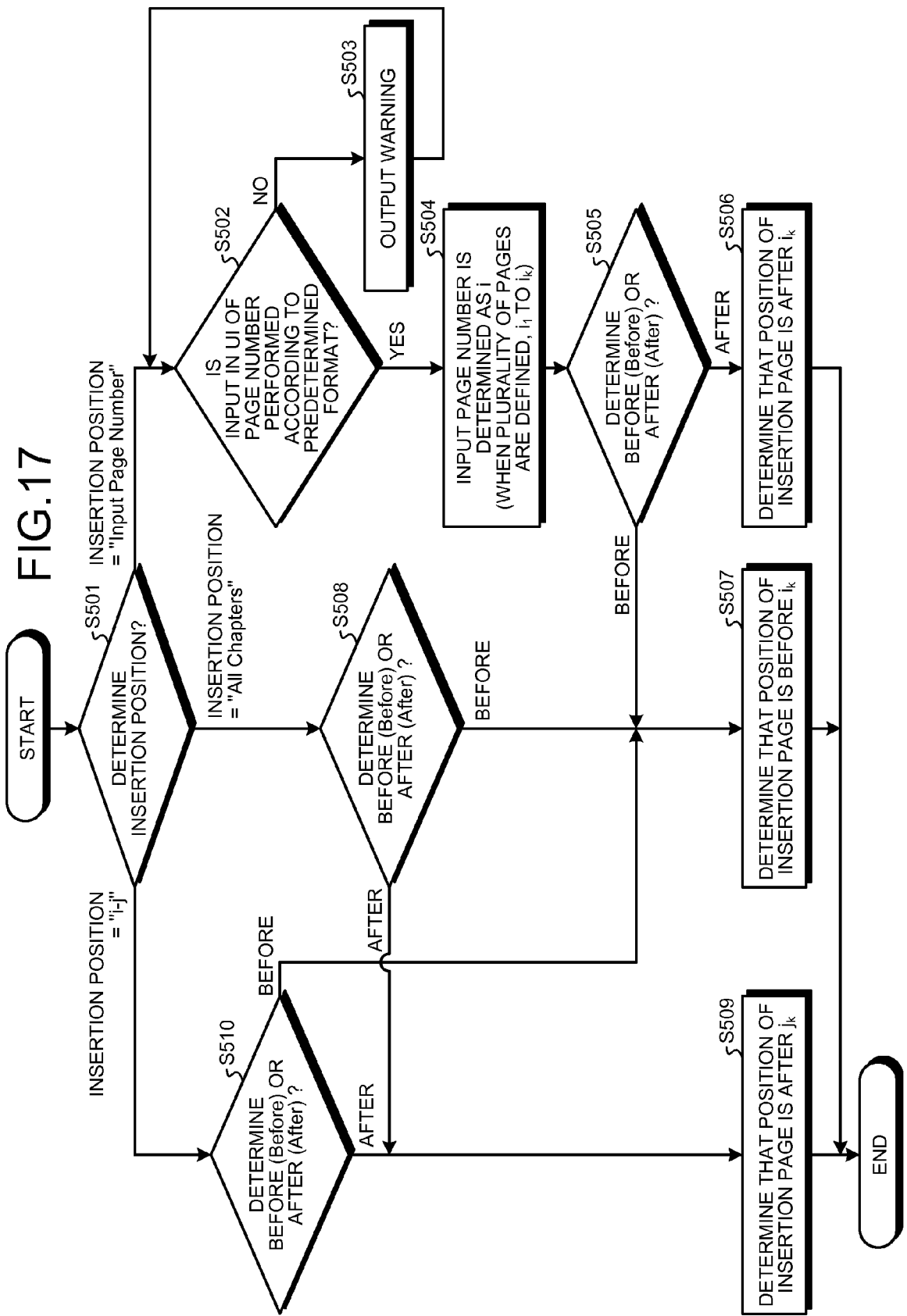
FIG. 17 is a flowchart illustrating an example of a procedure of insertion position setting processing according to the first embodiment.

Next, the following describes a procedure of insertion position setting processing according to the first embodiment with reference to FIG. 17. FIG. 17 is a flowchart illustrating an example of the procedure of the insertion position setting processing according to the first embodiment. The insertion position setting processing indicates processing when "Insert Position" is designated in the setting image for setting the insertion page illustrated in FIG. 7.

As illustrated in FIG. 17, the information processing device 100 determines the designated option of the insertion position "Insert Position" (Step S501). If the insertion position is designated with "Input Page Number", the information processing device 100 determines whether the input in the UI of page number "Page Numbers" is performed according to a predetermined format (Step S502). At this time, if the input is not correctly performed according to the predetermined format (No at Step S502), the information processing device 100 outputs a warning for prompting the user to perform correct input (Step S503). On the other hand, if the input is correctly performed according to the predetermined format (Yes at Step S502), the information processing device 100 determines the input page number as "i" (Step S504). When a plurality of page numbers are designated, the page numbers are determined as "$i_1$ to $i_k$".

Subsequently, the information processing device 100 determines whether before or after, regarding "Before or After Pages" (Step S505). In this case, if the after "After" is selected, the information processing device 100 determines that the position of the insertion page is after "$i_k$" (Step S506). On the other hand, if the before "Before" is selected, the information processing device 100 determines that the position of the insertion page is before "$i_k$" (Step S507).

If the insertion position is designated as all the chapters "All Chapters", the information processing device 100 determines whether before or after, regarding "Before or After Pages" (Step S508). At this time, if the before "Before" is selected, the information processing device 100 determines that the position of the insertion page is before "$i_k$" (Step S507). On the other hand, if the after "After" is selected, the information processing device 100 determines that the position of the insertion page is after "$j_k$" (Step S509).

If the insertion position is designated as the defined chapter "i–j", the information processing device 100 determines whether before or after, regarding "Before or After Pages" (Step S510). In this case, if the before "Before" is selected, the information processing device 100 determines that the position of the insertion page is before "$i_k$" (Step S507). On the other hand, if the after "After" is selected, the information processing device 100 determines that the position of the insertion page is after "$j_k$" (Step S509).

Procedure of Page Range Setting Processing

Figure 18:
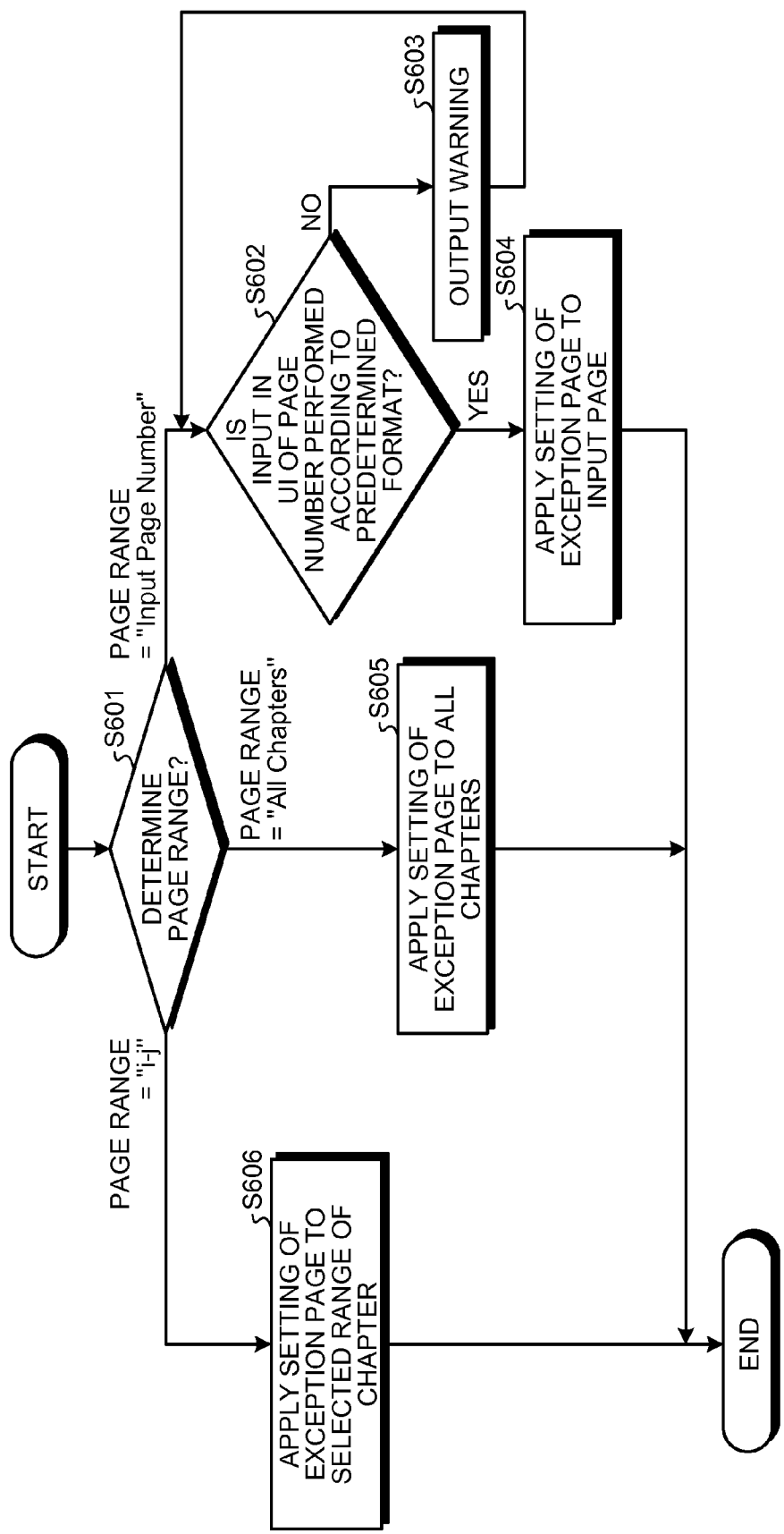
FIG. 18 is a flowchart illustrating an example of a procedure of page range setting processing according to the first embodiment.

Next, the following describes a procedure of page range setting processing according to the first embodiment with reference to FIG. 18. FIG. 18 is a flowchart illustrating an example of the procedure of the page range setting processing according to the first embodiment. The page range setting processing indicates processing when "Page Range" is designated in the setting image for setting the exception page illustrated in FIG. 9.

As illustrated in FIG. 18, the information processing device 100 determines the designated option of the page range "Page Range" (Step S601). If the page range is designated with "Input Page Number", the information processing device 100 determines whether the input is performed in the UI of page number "Page Numbers" according to the predetermined format (Step S602). In this case, if the input is not correctly performed according to the predetermined format (No at Step S602), the information processing device 100 outputs a warning for prompting the user to perform the correct input (Step S603). On the other hand, if the input is correctly performed according to the predetermined format (Yes at Step S602), the information processing device 100 applies the setting of exception page to the input page (Step S604).

If the page range is designated as all the chapters "All Chapters", the information processing device 100 applies the setting of exception page to all the chapters (Step S605). If the page range is designated as the defined chapter "i–j", the information processing device 100 applies the setting of exception page to the range of the selected chapter (Step S606).

Effect of First Embodiment

The information processing device 100 reflects the set values of the defined configuration of the chapters in the print setting screen related to the specialized page such as the insertion page or the exception page and receives designation of various print settings, so that the burden on the user can be reduced in print setting. The information processing device 100 displays the print setting screen including the option for designating all the chapters, the option for inputting the page number, and the option for designating each chapter, and receives the designation of various print settings, so that a flexible print setting can be performed according to a situation.

Second Embodiment

The embodiment of the printing system 1 according to the present invention has been described above. Alternatively, various different embodiments can be employed in addition to the above embodiment. A different embodiment will be described regarding a (1) configuration and a (2) computer program.

(1) Configuration

Information including a processing procedure, a control procedure, a specific name, various pieces of data or parameters, and the like described above and illustrated in the drawings can be arbitrarily changed unless specifically noted. The components of the devices illustrated in the drawings are merely conceptual, and it is not required that they are physically configured as illustrated. That is, the specific form of distribution and integration of the devices are not limited to those illustrated in the drawings. All or part thereof may be functionally or physically distributed/integrated in arbitrary units depending on various loads or usage states.

(2) Computer Program

The setting program executed by the information processing device 100 according to one aspect is recorded and provided in a computer-readable recording medium such as a compact disc read only memory (CD-ROM), a flexible disk (FD), a compact disc recordable (CD-R), and a digital versatile disc (DVD), as an installable or executable file. The setting program executed by the information processing device 100 may be stored in a computer connected to a network such as the Internet and provided by being downloaded via the network. Furthermore, the setting program executed by the information processing device 100 may be provided or distributed via a network such as the Internet. The setting program executed by the information processing device 100 may be embedded and provided in a ROM, for example.

The setting program executed by the information processing device 100 has a module configuration including the units described above (the image generation unit 111, the display control unit 112, the acquisition unit 114, and the ticket generation unit 116). As actual hardware, the CPU (processor) reads and executes the computer program from the storage medium, and each of the units is loaded on the main storage device. Accordingly, the image generation unit 111, the display control unit 112, the acquisition unit 114, and the ticket generation unit 116 are generated on the main storage device.

According to an aspect of the present invention, the burden on the user can be reduced in print setting.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising a processor that implements:
    an acquisition unit that acquires set values of chapters representing units into which an entire job is arbitrarily divided;
    an image generation unit that generates a print setting menu for a user to define print settings for individual pages of the job, wherein the generated print setting menu includes options for defining print settings for designated chapters based on the set values, wherein the print settings designate locations for placing insertion pages within the job;
    a display control unit that performs control to display the generated print setting menu on a display unit; and a ticket generation unit that generates a job ticket designating print settings based on user input applied to the print setting menu displayed on the display unit.

2. The information processing device according to claim 1, wherein the image generation unit generates the print setting menu including the set values of the chapters as one of the options related to a specialized page.

3. The information processing device according to claim 1, wherein the image generation unit generates the print setting menu including the set values of the chapters as one of the options related to an insertion page for inserting a new page.

4. The information processing device according to claim 1, wherein the image generation unit generates the print setting menu including the set values of the chapters as one of the options related to an exception page for designating a page range to which a setting different from a print setting for an entire page is applied.

5. The information processing device according to claim 1, wherein the image generation unit generates the print setting menu including the set values of the chapters as one of the options related to a tab sheet for utilizing a sheet different from a sheet for an entire page of an original as a partition.

6. The information processing device according to claim 1, wherein the image generation unit generates the print setting menu including the option for designating all chapters based on the set values of the chapters.

7. The information processing device according to claim 1, wherein the image generation unit generates the print setting menu including an option for inputting a page number and a text region that enables input when the option is selected.

8. The information processing device according to claim 7, wherein
when inconsistency is in the input of the page number, the image generation unit generates a warning image representing the inconsistency, and
the display control unit performs control to display the generated warning image on the display unit.

9. The information processing device according to claim 1, wherein
the acquisition unit stores the acquired set values in a storage unit in association with identification numbers for identifying the chapters, and
the image generation unit generates the print setting menu based on the set values of the chapters corresponding to the identification numbers stored in the storage unit.

10. The information processing device according to claim 1, wherein the image generation unit generates the print setting menu including the option for designating each chapter based on the set values of the chapters.

11. A print setting method executable by a processor, the method comprising:
acquiring set values of chapters representing units into which an entire job is arbitrarily divided;
generating a print setting menu for a user to define print settings for individual pages of the job, wherein the generated menu includes options for defining print settings on a chapter-by-chapter basis based on the set values, wherein the print settings designate locations for placing insertion pages within the job;
performing control to display the generated print setting menu on a display unit; and
generating a job ticket designating print settings based on user input applied to the print setting menu displayed on the display unit; and
transmitting the job ticket to a control device for processing a print job.

12. A computer program product comprising a non-transitory computer-readable medium containing an information processing program, the program causing a computer to perform:
acquiring set values of chapters representing units into which an entire job is arbitrarily divided;
generating a print setting menu for a user to define print settings for individual pages of the job, wherein the generated menu includes options for defining print settings on a chapter-by-chapter basis based on the set values, wherein the print settings designate locations for placing insertion pages within the job;
performing control to display the generated print setting menu on a display unit; and
generating a job ticket designating print settings based on user input applied to the print setting menu displayed on the display unit.

* * * * *